United States Patent
Nádas et al.

(10) Patent No.: US 9,167,478 B2
(45) Date of Patent: Oct. 20, 2015

(54) METHOD FOR EFFICIENT UTILISATION OF THE THROUGHPUT CAPACITY OF AN ENB BY USING A CACHE

(75) Inventors: Szilveszter Nádas, Budapest (HU); Johan Kölhi, Vaxholm (SE); Jan Söderström, Los Gatos, CA (US)

(73) Assignee: TELEFONAKTIEBOLAGET LM ERICSSON (PUBL), Stockholm (DE)

( * ) Notice: Subject to any disclaimer, the term of this patent is extended or adjusted under 35 U.S.C. 154(b) by 729 days.

(21) Appl. No.: 13/380,919

(22) PCT Filed: Jun. 26, 2009

(86) PCT No.: PCT/SE2009/050819
§ 371 (c)(1),
(2), (4) Date: Dec. 27, 2011

(87) PCT Pub. No.: WO2010/151193
PCT Pub. Date: Dec. 29, 2010

(65) Prior Publication Data
US 2012/0102140 A1    Apr. 26, 2012

(51) Int. Cl.
*G06F 15/173* (2006.01)
*H04W 28/14* (2009.01)
*H04L 12/26* (2006.01)
*H04W 28/02* (2009.01)

(52) U.S. Cl.
CPC ........... *H04W 28/14* (2013.01); *H04L 43/0888* (2013.01); *H04W 28/0205* (2013.01); *H04W 28/0226* (2013.01); *H04W 28/0247* (2013.01)

(58) Field of Classification Search
CPC ......... H04L 43/0888; H04W 28/0205; H04W 28/0226; H04W 28/0247; H04W 28/14
USPC .......................................................... 709/224
See application file for complete search history.

(56) References Cited

U.S. PATENT DOCUMENTS 6,426,942 B1 * 7/2002 Sienel et al. .................. 370/235
6,460,122 B1 * 10/2002 Otterness et al. ............. 711/154
6,986,019 B1 * 1/2006 Bagashev et al. ............. 711/217

(Continued)

FOREIGN PATENT DOCUMENTS

GB          2 423 219 A       8/2006

OTHER PUBLICATIONS

Border, et al: "Performance Enhancing Proxies Intended to Mitigate Link-Related Degradations". Network Working Group. Request for Comments: 3135. Jun. 2001.

(Continued)

*Primary Examiner* — Phuoc Nguyen

(57) ABSTRACT

Method and apparatus for enabling optimisation of the utilisation of the throughput capacity of a first and a second interface of an eNB, where the first and the second interface alternate in having the lowest throughput capacity, and thereby take turns in limiting the combined data throughput over the two interfaces. In the method, data is received over the first interface and then cached in one of the higher layers of the Internet Protocol stack. The output from the cache of data to be sent over the second interface is controlled, based on the available throughput capacity of the second interface. Thereby, the alternating limiting effect of the interfaces is levelled out.

39 Claims, 7 Drawing Sheets

(56) References Cited

U.S. PATENT DOCUMENTS

| | | |
|---|---|---|
| 7,460,032 B2 * | 12/2008 | Boldt et al. ............... 341/50 |
| 7,710,870 B2 * | 5/2010 | Lee et al. ............... 370/229 |
| 2002/0058480 A1 | 5/2002 | Ikeda |
| 2002/0068588 A1 | 6/2002 | Yoshida et al. |
| 2003/0236861 A1 * | 12/2003 | Johnson et al. ............ 709/219 |
| 2004/0062268 A1 | 4/2004 | Pendakur et al. |
| 2004/0264368 A1 | 12/2004 | Heiskari et al. |
| 2007/0080830 A1 * | 4/2007 | Sacks ............... 340/995.1 |
| 2007/0127465 A1 | 6/2007 | Faye |
| 2010/0023595 A1 * | 1/2010 | McMillian et al. ........ 709/212 |
| 2011/0264663 A1 * | 10/2011 | Verkasalo ............... 707/740 |
| 2012/0057511 A1 * | 3/2012 | Sivakumar et al. ........ 370/310 |

OTHER PUBLICATIONS

Bellavista, et al: "Mobile Proxies for Proactive Buffering in Wireless Internet Multimedia Streaming". XP-002686771. Jun. 10, 2005.

"Proactive network provider participation for P2P" retrieved from: http://en.wikipedia.org/w/index.php?title=proactive_network_provider_participation_for_P2P&oldid=296467494.

* cited by examiner

METHOD FOR EFFICIENT UTILISATION OF THE THROUGHPUT CAPACITY OF AN ENB BY USING A CACHE

CLAIM OF PRIORITY

This application is a 371 of PCT/SE2009/050819, filed Jun. 26, 2009, the disclosure of which is fully incorporated herein by reference.

TECHNICAL FIELD

The invention relates to a method and an arrangement in a communication system, and in particular to a method and an arrangement, which enable an efficient utilisation of available link capacity.

BACKGROUND

One key characteristic of mobile radio communication is the typically rapid and significant variations in the instantaneous channel conditions as illustrated for one user in a cell in FIG. 1a. There are several reasons for these variations. Frequency-selective fading will result in rapid and random variations in the channel attenuation. Shadow fading and distance dependent path loss will also affect the average received signal strength significantly. Further, the interference at the receiver due to transmissions in other cells and by other terminals will also impact the interference level. Therefore, radio communication fluctuates in speed (throughput), signal quality and coverage. The fluctuation may become even more pronounced in situations where a user terminal involved in a communication moves around in a cell, perhaps with a considerable velocity, and, as mentioned above, when there are many terminals competing for the available bandwidth in a cell.

The different parts of a transport network, also called the backhaul, which connects for example a base station to the rest of a network, could generally be said to be less variable than a radio interface, although the backhaul also may vary in available bandwidth and signal quality.

The throughput from a content providing server to a user terminal, or from a user terminal to a content server is a function of the throughput of all the involved parts of the communication chain between the server and the user terminal. Therefore, it may occur that one part of the communication chain has a momentary high available bandwidth, which is not fully utilised, since a preceding part of the communication chain has a lower momentary available bandwidth.

It has previously been proposed to use buffers or proxies in different parts of networks. An overview of state-of-the-art proxy solutions are summarised in "Performance Enhancing Proxies Intended to Mitigate Link-Related Degradations" (RFC 3135).

One problem with existing solutions is that it is hard to optimise or at least improve the utilisation of the available bandwidth in different parts of a communication chain. The available capacity of certain parts of a communication chain may be underutilised.

SUMMARY

In addition to the above mentioned problems, it has been identified that in the case where an air interface capacity is highly fluctuating, it may occur that the interface towards a core network, i.e. the transport network, and the air interface alternate in being a bottleneck, i.e. take turns in being a limiting factor of the data throughput over the two interfaces. This situation has not been addressed in prior art. Since the amount of data which can be buffered in an eNB is very limited, both the capacity of the interface towards the core network and the air interface capacity may be underutilised.

It would be desirable to obtain improved utilisation of throughput capacity of the communication chain between a server or other content provider and a user terminal. It is an object of the invention to address at least some of the issues outlined above. Further, it is an object of the invention to provide a mechanism for enabling an improved utilisation of the throughput capacity of an interface towards a core network and an air interface of an eNB, which may also be denoted an eNodeB. These objects may be met by the attached independent claims.

According to one aspect, a method is provided in an eNB for enabling optimisation of the utilisation of the throughput capacity of a first and a second interface of the eNB. The first and the second interface alternate in having the lowest throughput capacity, and thereby take turns in limiting the combined data throughput over the two interfaces. Data is received over the first interface. The received data is then cached in one of the higher layers of the Internet Protocol stack, such as the application layer or the transport layer. The output from the cache of data to be sent over the second interface is controlled based on the available throughput capacity of the second interface. Thereby, the alternating limiting effect of the interfaces is levelled out.

According to another aspect, an eNB is adapted to enable optimisation of the utilisation of the throughput capacity of a first and a second interface of the eNB. The first and the second interface alternate in having the lowest throughput capacity, and thereby take turns in limiting the combined data throughput over the two interfaces. A receiving unit is adapted to receive data over the first interface, and a caching unit is adapted to cache the received data in one of the higher layers of the Internet Protocol stack. A control unit is adapted to control the output of the cached data over the second interface, based on the available throughput capacity of the second interface. Thereby, the alternating limiting effect of the interfaces is levelled out.

The scenario may be uplink or downlink, and therefore, in one embodiment, the first interface is the interface towards a core network and the second interface is an air interface towards a user terminal camping on a cell of the eNB, i.e. a downlink scenario; and in another embodiment, the first interface is an air interface towards a user terminal camping on a cell of the eNB and the second interface is the interface towards a core network.

Different embodiments are possible in the method and node above. In one exemplary embodiment the caching is performed in the transport layer, and in another embodiment the transport layer is specified to be the TCP layer. By performing the caching in the TCP-layer, many applications can be addressed with a single solution. The caching can be performed on a "per TCP flow" basis, which means that the caching can be performed "per user".

Further, the amount of data which is cached in the TCP-layer can be controlled by using conventional TCP buffer control mechanisms. Further, the caching unit may be a TCP-layer proxy, which does not require that any changes are made to the end systems, transport endpoints or applications, which are involved in a connection, and/or the caching unit may be a TCP-layer proxy, which is implemented within a single node and represents a single point at which performance enhancement is applied, i.e. the TCP-layer proxy may be transparent and/or integrated. The caching unit may be further adapted to interact with the Radio Link Control, so that the Radio Link Control can operate directly on the buffer(s) of the caching unit.

In another embodiment, the caching is performed in the application layer. One advantage with an application layer solution is that more intelligence can be placed directly in the network. Further, UL transmissions may be saved if the data to be uploaded is already available in the cache. The caching unit may be implemented as an application layer proxy.

In one embodiment, the cache is made available to user terminals, which are served by the eNB. With support from the Core Network, application layer caching can allow several user terminals to access the same content, without transmitting the content over the Transport Network In another embodiment, the amount of data to be cached for one user is dynamically adapted based on the behaviour of the user. Thereby, the amount of data will be sufficiently big to level out the alternating limiting interfaces, but not unnecessarily big. The user behaviour may be the user scheduling history and/or the user mobility history. The user scheduling history may comprise the variance of the throughput to the user during a period of time. The user mobility history may comprise the average throughput to the user during a period of time.

In one embodiment, the cache state information may be transferred to a target eNB during handover of a user terminal if the target eNB comprises a cache. Cached user data may be transferred to the target eNB in case of downlink communication.

In one embodiment, a handover to a target eNB is performed in cooperation with a cache node in a point of concentration on a higher hierarchical level of the network, i.e. a central cache node on a level somewhere above the eNB. The data which is cached in the source eNB will then not need to be transferred to the target eNB, since the data could be transferred to the target eNB from the central cache node instead. Such a transfer is both faster and cheaper than an eNB-eNB transfer. The cache state information is, however, still transferred from the source eNB to the target eNB if the target eNB comprises a cache.

In another embodiment, the caching is performed in cooperation with a central cache node In one embodiment concerning an uplink scenario, the amount of uplink data which is cached in the eNB is controlled by using the conventional uplink air interface scheduling functionality to stop or reduce the speed of a data transfer from a user terminal.

The different features of the exemplary embodiments above may be combined in different ways according to need, requirements or preference.

BRIEF DESCRIPTION OF THE DRAWINGS

The invention will now be explained in more detail by means of exemplary embodiments and with reference to the accompanying drawings, in which.

DETAILED DESCRIPTION

An eNB has an interface towards the core network and an air interface towards user terminals within the cell(s), controlled by the eNB, and possible relay nodes etc. A user terminal, which is active in a cell, which is controlled by a certain eNB may also be referred to as "camping" on said cell. Typical examples of interfaces towards the core network are the S1-interface in LTE, and the Iu-interface in Flat Architecture WCDMA. The interface towards the core network may also be for example a radio or microwave air interface.

An air interface may vary considerably in capacity due to different factors, such as e.g. the movement of user terminals, the cell load, different types of interference, scheduling, etc. The capacity of the interface towards the core network does normally not vary as much. However, it may vary due to congestion or that other traffic shares the same transport.

Figure 1A:
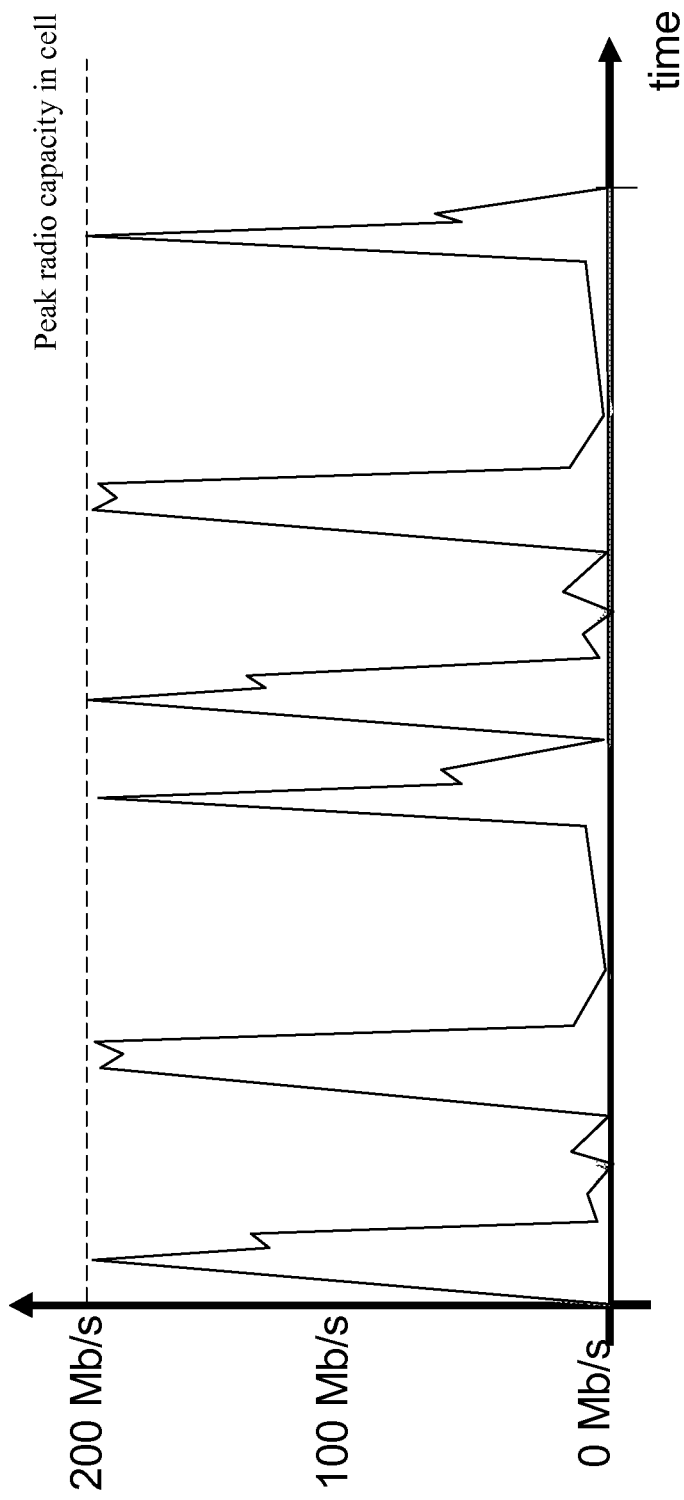
FIG. 1a illustrates variations in radio capacity for a user terminal in a cell according to the prior art.
Figure 1B:
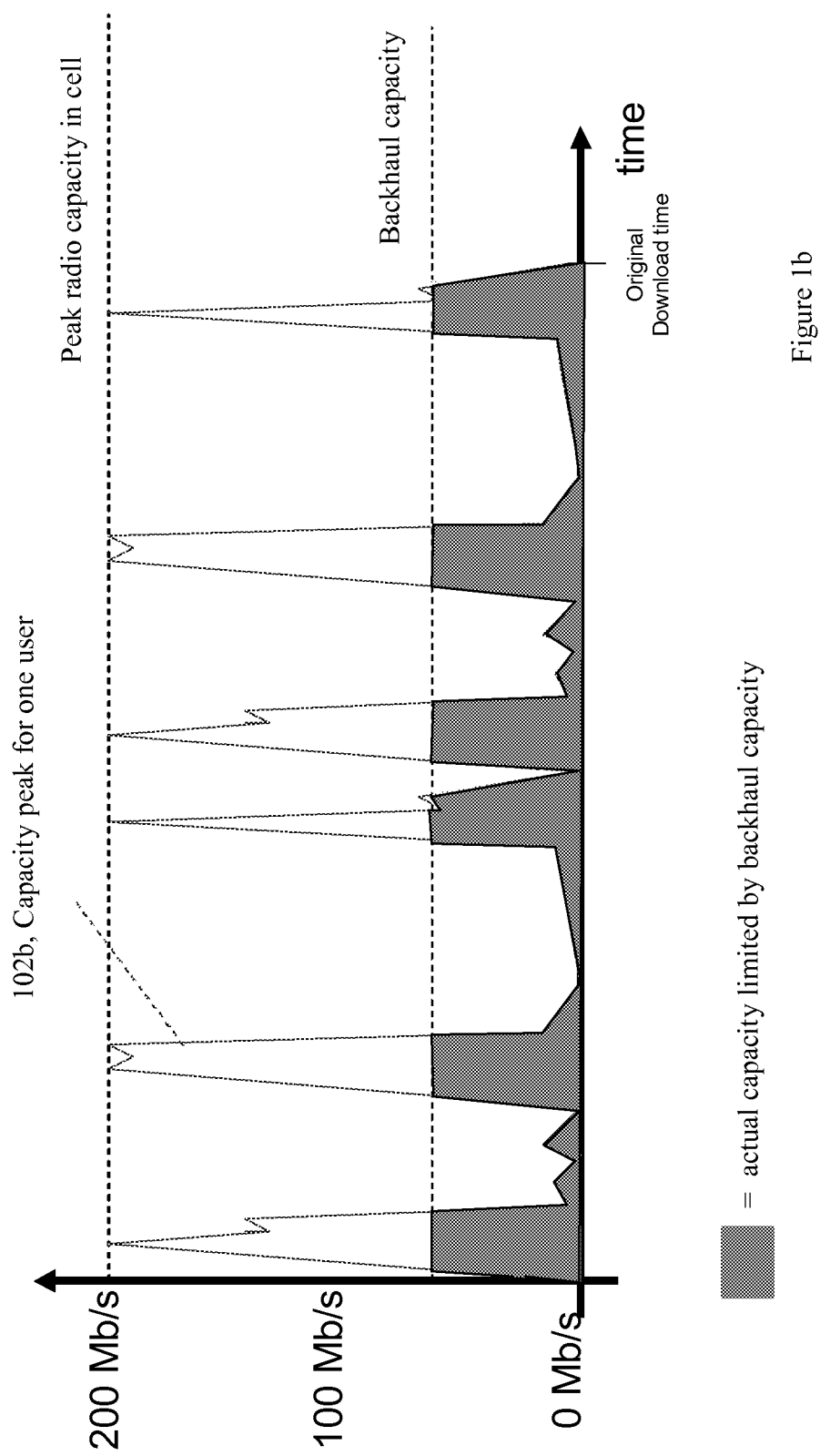
FIG. 1b illustrates the identified situation of alternating bottlenecks for one user terminal.

When having identified that the interfaces of an eNB alternate or oscillate in being the limiting factor of the combined throughput over the eNB, it is desirable to find a solution to this identified phenomenon, which is illustrated in FIG. 1b.

FIG. 1b shows a downlink scenario where the capacity of the interface towards the core network, also called the backhaul capacity, is outlined as rather constant, whereas the capacity of the air interface is fluctuating considerably. In the figure, it can be seen that in different periods, air interface capacity, or transport network capacity, cannot be fully utilised. The shaded area, below the dashed line indicating the backhaul capacity, illustrates the actual throughput, which is obtainable by a user terminal. The white areas below the dashed line indicating the backhaul capacity illustrate the situations where the throughput is limited by the capacity of the air interface. The white parts of the air interface capacity peaks, i.e. the parts of the peaks exceeding the backhaul capacity limit, illustrate the situations where the throughput is limited by the backhaul capacity.

Figure 2:
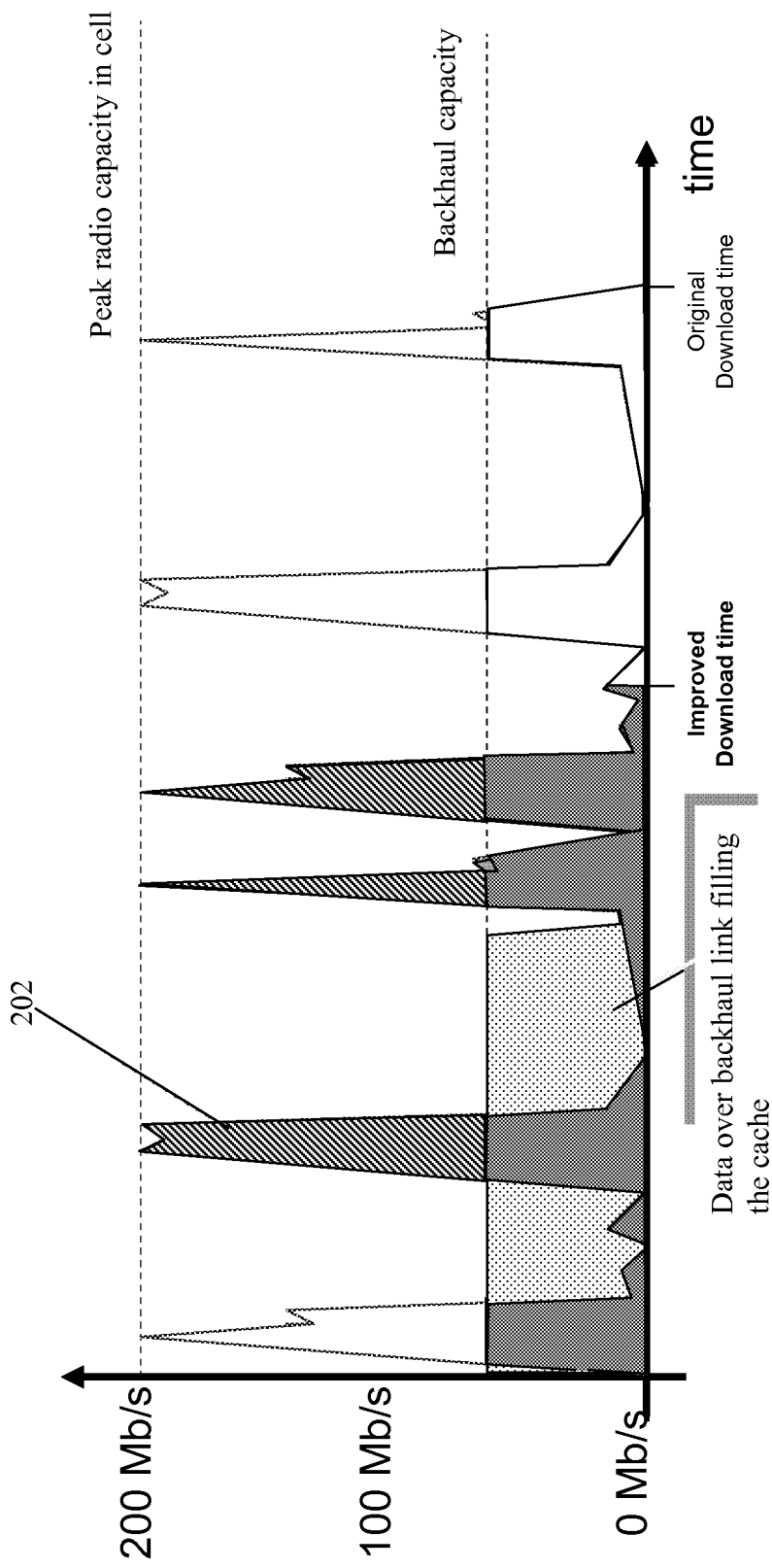
FIG. 2 illustrates the improved utilisation of the air interface after applying one embodiment of the invention.

In order to address these identified limitations, it is further identified that it would be desirable to have the possibility to buffer data in order to be able to transmit data when the output interface capacity so permits, even if the input interface momentarily cannot deliver data at the required pace. This buffering could possibly take place in a strategic node in the transport network or in the eNB. Since the eNB is at the border between the access transport network, also called the backhaul, and the air interface, the eNB is identified as a desirable location for a buffering possibility. Placing a cache in the eNB would enable an improved utilisation of the throughput capacity of the transport network and the air interface. One example embodiment of caching in an eNB is illustrated in FIG. 2. FIG. 2 illustrates the same downlink scenario as FIG. 1b, only this time with a possibility to cache data in the eNB. From the figure, it can be seen how data on the backhaul link is used to fill the cache, and during periods of high air interface capacity, such as the peak 202, data from the cache is used to make better use of the available air interface capacity.

In many current cellular technologies, such as for example in HSPA or LTE, scheduling queues per flow are used in the eNBs, which could be seen as a sort of buffering. However, these queues are of a limited size, since they are regulated by the window size of the TCP (Trasport Control Protocol). Consequently, these scheduling queues can only contain a small amount of PDUs (Protocol Data Units). The term "flat", which is used within this document in for example the context "flat WCDMA", is used as meaning a system where the base station and the RNC are "integrated", having a function much like the eNB in LTE. Throughout this document the term eNB is mostly used as meaning both actual eNBs and NodeBs, which are integrated with an RNC.

Since the GTP-U (GPRS Tunneling Protocol for user data) is terminated in the eNB, it is possible to access the end-user IP packets in an eNB. This is also true for the common RNC-NodeB in case of HSPA flat RAN, since the protocol stack in that case is similar. Therefore, it is actually possible to place a cache memory in an eNB, which memory may cache end-user IP packets.

The caching can be implemented by introducing a proxy at a carefully selected location within the eNB. The proxy could e.g. be a so called PEP, i.e. a Performance Enhancing Proxy. A PEP is an entity in the network, which acts on behalf of an end system or user terminal in order to enhance protocol performance. This can be done with or without knowledge of the end system or user terminal.

A PEP implementation may be "integrated", i.e. it may comprise a single PEP component implemented within a single node. An integrated PEP implementation represents a single point at which performance enhancement is applied. In the context of a PEP, the term "transparent" refers to when the PEP solution does not require that any changes are made to the end systems, transport endpoints or applications, which are involved in a connection.

The specific placement of the cache within the eNB is important for the outcome of the introduction of a cache. Two preferred alternatives are identified: a TCP layer solution or an application layer solution, where "layer" refers to the layers of the Internet Protocol stack.

The TCP layer solution will now be described in further detail. By placing a cache in the TCP layer, many applications can be covered by a single solution, i.e. many different applications can be served by the same TCP layer solution. In fact, all TCP based services are supported by a TCP layer solution. Further, a TCP layer solution is a "per TCP flow" solution, which is a "per user" solution as opposed to most previously known caching solutions. One user terminal may have several TCP flows. A TCP layer PEP, which is a PEP that operates at the transport layer with TCP, may be introduced in the eNB. An integrated transparent TCP PEP may be an attractive alternative, since the end-user terminals would not need to "be aware" of such a transparent mechanism, i.e. the end user terminal would not need to be adapted or changed in order to function after introduction of such a proxy solution.

Figure 4:
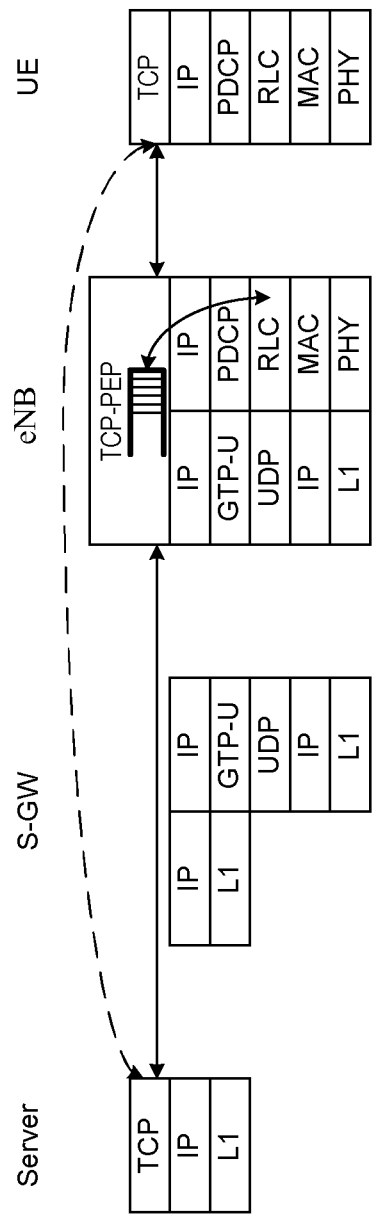
FIG. 4 illustrates an example of cross-layer interaction according to one embodiment.

The introduction of a TCP PEP enables further embodiments, as for example cross layer interaction between the RLC layer (Radio Link Control layer) and the TCP PEP, which is illustrated in FIG. 4. In a cross layer implementation, the RLC layer could be enabled to operate directly on the TCP PEP buffer(s), which sets aside the need for regular TCP congestion control between the eNB and the user terminal. Regular TCP congestion control could be used between the eNB and the server, and conventional TCP buffer control mechanisms can be utilised to control the amount of data which is cached in the PEP.

The application layer solution mentioned above will now be described in further detail. The cache can alternatively be placed in the application layer. The cache could be realised by for example a web proxy, or a P2P proxy where the application layer proxy acts as a supernode in the network, a time-shift TV-proxy, an RTSP proxy (Real Time Streaming Protocol) for IPTV streaming or similar ALG-like proxies (Application Level Gateway). This type of cache implementation may run in either "transparent" or "proxy" mode. The application layer proxies may also be "integrated", but that is more complex to achieve than in the TCP-layer solution. The transparent mode requires no modification of the end-systems, while the proxy mode requires some special configuration. For example, if the application layer proxy is not transparent, a mechanism which ensures that the connection is switched to the proxy in the target eNB is needed.

The application layer proxy solution enables more intelligence to be placed directly in the network. One example of such intelligence is that the proxy can continue a P2P download in progress, even if the terminal being the destination of the download looses most of its available bandwidth during a certain period of time. An application layer proxy may also reduce the amount of uplink radio transmissions needed, since data to be uploaded from a user terminal may potentially already be available in the cache/proxy.

Depending on how the application layer proxy is implemented, there may be a need to support some S-GW (Serving GateWay) functions in the eNB, such as for example charging and access verification. This need is due to that the end-user terminal might not generate data in the core network when downloading data, due to that the data to be downloaded may already be present in the proxy if it has been downloaded by other user terminals, and thereby the download data do not pass by the S-GW, which normally would handle functions like charging etc. The application layer proxy solution may be "per user", but then a user terminal can still reuse data downloaded by another user terminal in some cases, depending on application, e.g. it can reuse static web content.

An embodiment will now be described, where the amount of data to be cached per user is controlled. In order to render the use of caching efficient and for the caches not to overflow, the amount of data to be stored in the cache memory should be controlled. The amount of data to be stored per user in the cache could be dynamically adapted based on user behavior, such as for example the mobility and/or scheduling history of a user. These values could in their turn be based on the average throughput for a user terminal and the variance of said throughput. The information about the throughput for a user terminal and the variance of the throughput is available in the eNB. As an example, it would be useful to cache a large amount of data for a user with a history of relative stationarity and a high average throughput, since this user is not so likely to leave the cell, and the cached data can be transmitted fast due to the high average throughput. On the other hand, for a fast moving user terminal or a user terminal with a low average throughput, a smaller amount of data should be cached. A fast moving user terminal is likely to be handed over to a target cell, whereby the cache state and potentially the cache content have to be transferred to the target eNB, and for a user terminal with a low throughput average, it is of no use to cache a large amount of data due to the relatively small amount of data which could actually be delivered to the user terminal over a period of time. The user behavior may also include e.g. physical location, movement, speed or time spent in a cell. The amount of data to be stored could also be adapted based on e.g. user capability, user subscription, available memory space, available rates, server IP address, QoS settings, amount of data transmitted so far on the TCP connection.

In embodiments of the TCP layer solution, the TCP buffer control mechanisms can be used to control the amount of data, which is to be cached. However, for the uplink case, using the air interface scheduling functionality to control the amount of data to be cached can be a more attractive alternative. This is done by making the air interface scheduling functionality adapt the amount of incoming data from a user terminal to match a decided "caching amount", by stopping or reducing/increasing the speed of the incoming data transfer from the user terminal according to cache filling level. Different embodiments relating to handover will now be described. In a handover situation, it must be considered whether the target eNB comprises a cache or not, and both cases must be managed. In a downlink situation where the target eNB has a cache, the source eNB's cache content of user data and information about the cache state is transferred to the target eNB. In the uplink case, only the information about the source eNB's cache state needs to be transferred, since the user data can be transferred to its destination directly from the source eNB.

In the case where the target eNB does not have a caching functionality, the cached user data is transferred to the target eNB, but not the source eNB's cache state information. The transfer of cache state information and user data is performed via, for example, the X2 interface in LTE, or the Iur interface in WCDMA flat RAN. The transmission of data from the target eNB to a user terminal can begin before the transfer of all user data from the source eNB's cache is completed. In the uplink case, however, the target eNB may not transmit its cache content until all data in the source eNB cache have been transmitted. Therefore, some further coordination is needed in the uplink case, such as that e.g. the target eNB should be notified when all cached data in the source cache is transmitted.

Different embodiments relating to hierarchical caches will now be described. In order to further facilitate the transfer of data and reduce the amount of user data which is transferred between eNBs, hierarchical caches may be implemented. A cache node, which cooperates with the caches in the eNBs, is then implemented in a point of concentration, for example in the core network. This enables that no user data needs to be transferred from a source eNB to a target eNB, with or without cache, in a handover situation, since the central cache node will be able to transmit the data in question to the target eNB. This enables a more efficient handling of handover situations, for example since a data transfer from a higher hierarchical level to an eNB in general is faster and cheaper than a transfer between eNBs. It is also easier to access the user data from a central cache unit than directly from a server, in the cases when it would have been possible to require the user data directly from the server instead of transferring them from the source eNB. Further, the need for uplink data transfer from a user terminal or eNB cache may be reduced, since for example data to be uploaded to a server from a user terminal may already be present in the central cache since an earlier data transfer. This would render the uploading more efficient, since the capacity of the uplink in general is quite moderate. The corresponding downlink scenario is also possible, i.e. where data to be downloaded from a server is already present in the central cache unit, and therefore could be transmitted from the central cache unit to a user terminal instead of from the server. However, typically the benefits of the downlink scenario will not be as important as for the uplink scenario, at least not as long as the downlink capacity is significantly higher than the uplink capacity.

Figures 3A, 3B:
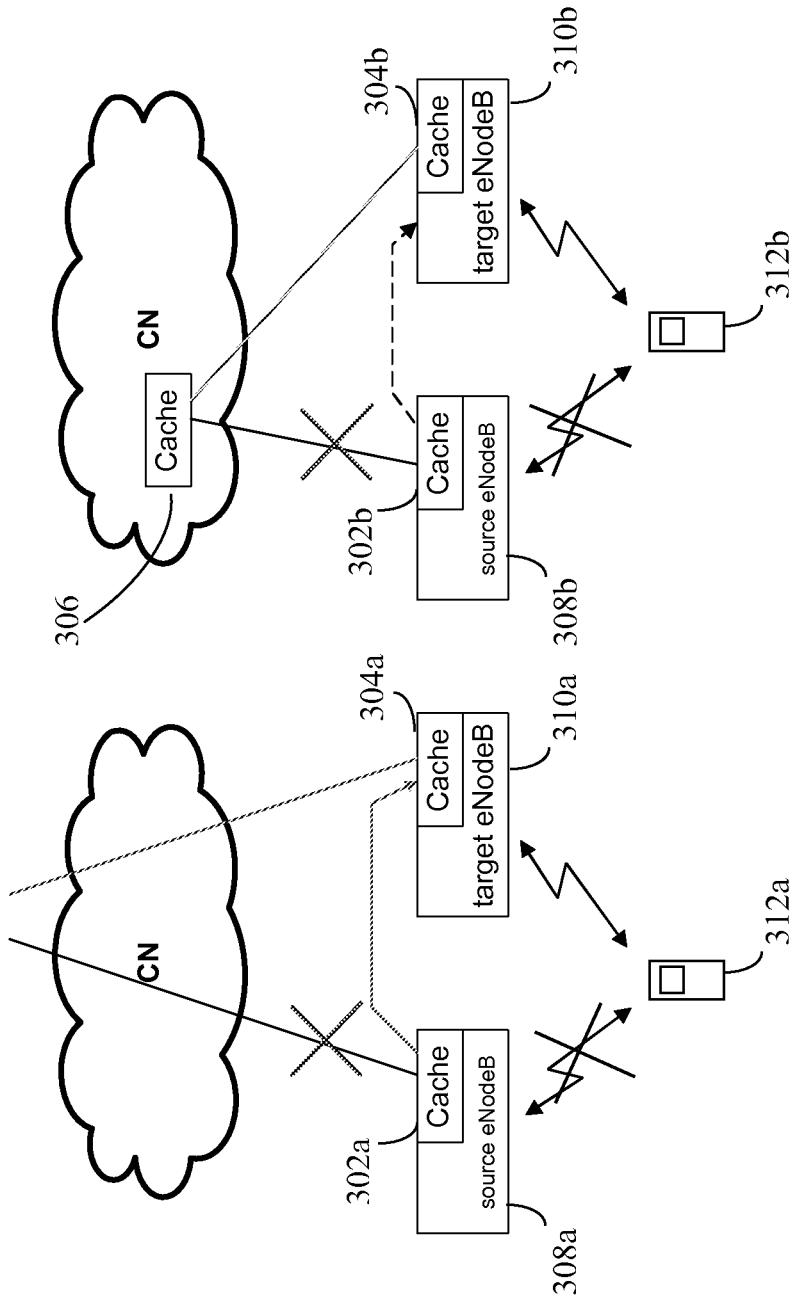
FIGS. 3a and 3b illustrate different cases of transition of cache state information and user data in case of the performance of a hand over according to different embodiments of the invention.

A handover situation, with and without a central cache unit, between eNBs 308, 310 comprising caches 302, 304 is illustrated in FIGS. 3a and 3b. The original links, which existed before the handover was initiated are marked with a cross. In FIG. 3a, which shows a situation without a central cache unit, the caches 302a and 304a communicate "directly" with a server (not shown), and the user data content of the source cache 302a is transferred to the target cache 304a together with the source cache state information. In FIG. 3b, which shows a situation with a central cache unit, the cached user data does not need to be transferred from the source cache 302b to the target cache 304b, since the corresponding user data is delivered to the target cache 304b by the central cache unit 306. However, the source cache state information is still transmitted from the source eNB to the target eNB and is illustrated by a dashed arrow. It should be noted that FIG. 3 merely illustrates the functional units in the eNBs 308-310 and in the core network in a logical sense, i.e. other functions than the illustrated ones may be involved in the communication between the caches and other nodes.

Figure 5:
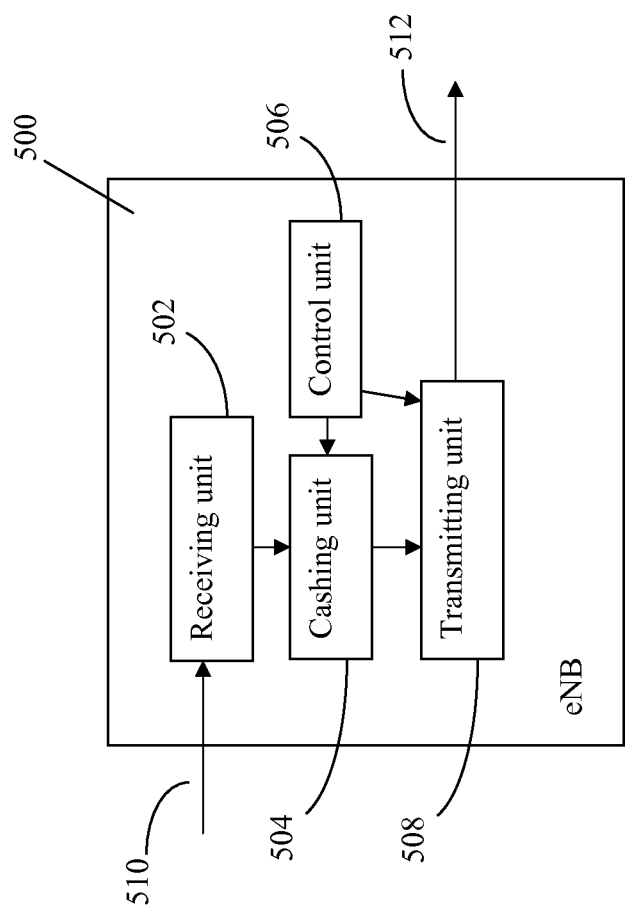
FIG. 5 is a block diagram illustrating and eNB according to one embodiment.

FIG. 5 is a block diagram, which illustrates an arrangement 500 according to one embodiment of the invention. Data is received over a first interface 510 by a receiving unit 502 and is cached in a caching unit 504. A control unit 506 is adapted to control the output of data from the cache to a transmitting unit 508 based on the available throughput capacity of a second interface. The transmitting unit 508 is adapted to then transmit the data over a second interface 512. It should be noted that FIG. 5 merely illustrates various functional units in the eNB 500 in a logical sense. However, the skilled person is free to implement these functions in practice using any suitable software and/or hardware means. Thus, the invention is generally not limited to the shown structure of the eNB 500.

Figure 6:
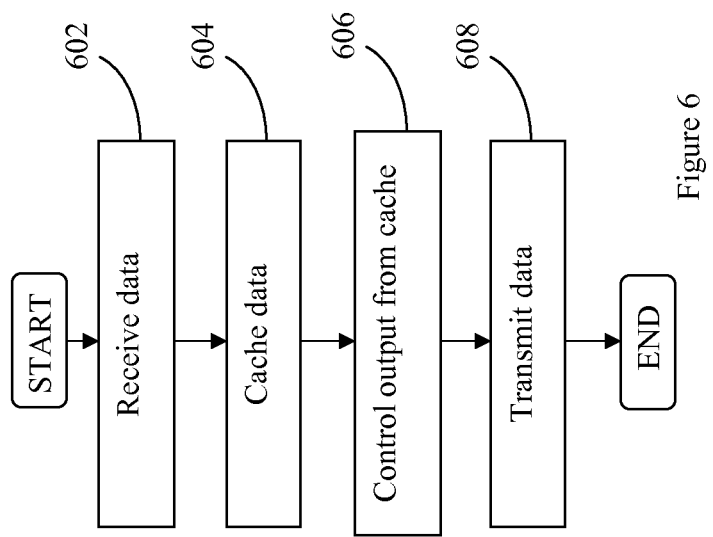
FIG. 6 is a flow chart illustrating a procedure for improving resource utilisation according to one embodiment.

FIG. 6 is a flow chart, which illustrates a procedure for improving resource utilisation according to one embodiment of the invention. The procedure begins with receiving 602 data over a first interface, after which the date is cached 604. The output of data from the cache is controlled 606, after which the output data is transmitted over a second interface.

Figure 7:
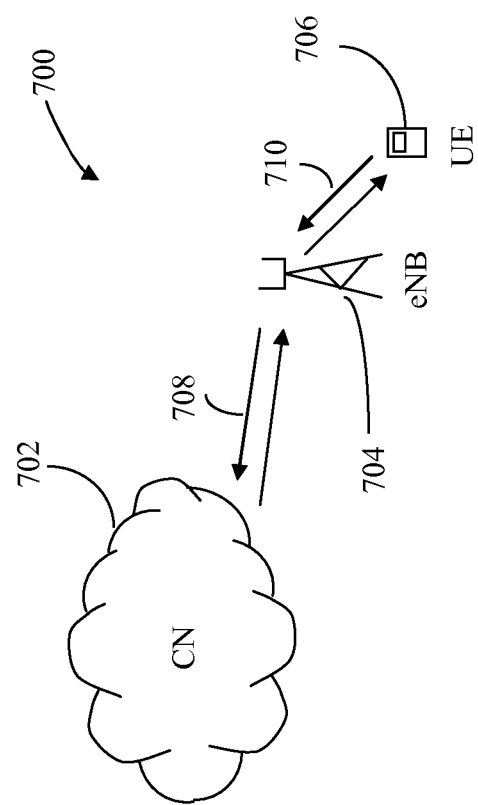
FIG. 7 is a schematic overview of a communication scenario, where embodiments of the invention could be applied.

FIG. 7 illustrates a communication scenario 700, where embodiments of the invention could be applied, comprising a mobile user terminal 706, an eNB 704 and a core network 702. The core network may be connected to a number of different servers or other nodes, which are not shown. The interface 708 towards the core network may for example be implemented as an S1 interface in case of LTE, or it could be implemented as an Iu interface in case of flat architecture WCDMA.

While the invention has been described with reference to specific example embodiments, the description is in general only intended to illustrate the inventive concept and should not be taken as limiting the scope of the invention. The different features of the examples and embodiments described herein may be combined in different ways by a person skilled in the art according to for example situation, need or preference.

The invention claimed is:

1. A method in an Evolved Node B (eNB) in a communication system, for enabling optimization of a utilization of throughput capacity of a first interface and a second interface of the eNB, the method comprising:

receiving, by the eNB, data over the first interface, where the first interface and the second interface alternate in having a lowest throughput capacity, which limits a combined data throughput over the first interface and the second interface, caching, by the eNB, the received data in one of a plurality of layers of an Internet Protocol stack, and controlling, by the eNB, an output of the cached data over the second interface, based on an available throughput capacity of said second interface, thereby levelling out an alternating limiting throughput effect of the first interface and the second interface.

2. The method according to claim 1, wherein the first interface is an interface towards a core network and the second interface is an air interface towards a user terminal camping on a cell of the eNB.

3. The method according to claim 1, wherein the first interface is an air interface towards a user terminal camping on a cell of the eNB and the second interface is an interface towards the core network.

4. The method according to claim 1, wherein the caching is performed in a transport layer of the Internet Protocol stack.

5. The method according to claim 1, wherein the caching is performed in a Transport Control Protocol (TCP)-layer of the Internet Protocol stack.

6. The method according to claim 5, further comprising:
controlling an amount of the received data which is cached by using conventional Transport Control Protocol (TCP) buffer control mechanisms.

7. The method according to claim 1, wherein the caching is performed in an application layer of the Internet Protocol Stack.

8. The method according to claim 1, wherein the eNB has the cached data which is made available to user terminals, which are served by the eNB.

9. The method according to claim 1, further comprising;
dynamically adapting an amount of data to be cached for a user based on a behaviour of the user.

10. The method according to claim 9, wherein the user behaviour is at least one of a user scheduling history and a user mobility history.

11. The method according to claim 10, wherein the user scheduling history comprises a variance of a throughput to a user terminal during a period of time.

12. The method according to claim 10, wherein the user mobility history comprises an average throughput to a user terminal during a period of time.

13. The method according to claim 1, wherein during a handover of a user terminal to a target eNB further comprising:
transferring cache state information to the target eNB in case the target eNB comprises a cache, and,
transferring cached user data to the target eNB in cases of downlink communication.

14. The method according to claim 1, wherein during a handover of a user terminal to a target eNB further comprising:
cooperating with a cache node in a point of concentration on a higher hierarchical level in the communication system, thereby eliminating a need to transfer cached user data to the target eNB, and,
transferring cache state information to the target eNB in case the target eNB comprises a cache.

15. The method according to claim 1, wherein the caching is performed in cooperation with a cache node in a point of concentration on a higher hierarchical level in the communication system.

16. The method according to claim 1, wherein, in case of uplink communication, the method further comprises:
controlling an amount of uplink data which is cached in the eNB by using an uplink air interface scheduling functionality to stop or reduce a speed of a data transfer from a user terminal.

17. An Evolved Node B (eNB) in a communication system, the eNB having a first interface and a second interface, the eNB adapted to enable optimization of a utilization of throughput capacity of the first interface and the second interface of the eNB, the eNB comprising:
a receiving unit adapted to receive data over the first interface, where the first interface and the second interface alternate in having a lowest throughput capacity, which limits a combined data throughput over the first interface and the second interface,
a caching unit adapted to cache the received data in one of a plurality of layers of an Internet Protocol stack, and
a control unit adapted to control an output of the cached data over the second interface, based on an available throughput capacity of said second interface, thereby levelling out an alternating limiting throughput effect of the first interface and the second interface.

18. The eNB according to claim 17, wherein the first interface is an interface towards a core network and the second interface is an air interface towards a user terminal camping on a cell of the eNB.

19. The eNB according to claim 17, wherein the first interface is an air interface towards a user terminal camping on a cell of the eNB and the second interface is an interface towards a core network.

20. The eNB according to claim 17, wherein the caching unit is further adapted to operate on a transport layer of the Internet Protocol Stack.

21. The eNB according to claim 17, wherein the caching unit is further adapted to operate on a Transport Control Protocol (TCP)-layer of the Internet Protocol Stack.

22. The eNB according to claim 17, wherein the caching unit is a Transport Control Protocol (TCP)-layer proxy, which does not require that any changes be made to end systems, transport endpoints or applications, which are involved in a connection.

23. The eNB according to claim 17, wherein the caching unit is a Transport Control Protocol (TCP)-layer proxy, which is implemented within a single node and represents a single point at which performance enhancement is applied.

24. The eNB according to claim 17, wherein the caching unit is further adapted to interact with a Radio Link Control layer, so that the Radio Link Control layer can operate directly on one or more buffers of the caching unit.

25. The eNB according to claim 17, wherein the eNB is further adapted to use conventional Transport Control Protocol (TCP) buffer control mechanisms to control an amount of data which is cached.

26. The eNB according to claim 17, wherein the caching unit is further adapted to operate on an application layer of the Internet Protocol Stack.

27. The eNB according to claim 17, wherein the caching unit is an application layer proxy.

28. The eNB according to claim 17, wherein the eNB and the caching unit are further adapted to make the cache available to user terminals, which are served by the eNB.

29. The eNB according to claim 17, wherein the caching unit is further adapted to dynamically adapt an amount of cached data based on user behaviour.

30. The eNB according to claim 17, wherein the eNB is further adapted to transfer, during a handover, at least one of cache state information and cached user data to a target eNB.

31. The eNB according to claim 17, wherein the eNB is further adapted to, during a handover, transfer cache state information to a target eNB, and cooperate with a cache node in a point of concentration on a higher hierarchical level in the communication system, thereby eliminating a need to transfer user data from the eNB cache to the target eNB.

32. The eNB according to claim 17, wherein the eNB is further adapted to perform caching in cooperation with a cache node in a point of concentration on a higher hierarchical level in the communication system.

33. The eNB according to claim 17, wherein the eNB is further adapted to control an amount of uplink data which is cached in the eNB by using an uplink air interface scheduling functionality to stop or reduce a speed of a data transfer from a user terminal.

34. A method in a signalling node in a core network of a communication system comprising an eNB, the eNB having a first interface and a second interface, the eNB adapted to enable optimization of a utilization of throughput capacity of the first interface and a second interface of the eNB, the eNB comprising:
   a receiving unit adapted to receive data over the first interface, where the first interface and the second interface alternate in having a lowest throughput capacity, which limits a combined data throughput over the first interface and the second interface,
   a caching unit adapted to cache the received data in one of a plurality of layers of an Internet Protocol stack, and
   a control unit adapted to control an output of the cached data over the second interface, based on an available throughput capacity of said second interface, thereby levelling out an alternating limiting throughput effect of the first interface and the second interface;
   the method comprising the step of:
      granting, by the signalling node, user terminals, which camp on a cell of the eNB, access to the cached data in the eNB.

35. Signalling node in a core network of a communication system comprising an eNB, the eNB having a first interface and a second interface, the eNB adapted to enable optimization of a utilization of throughput capacity of the first interface and a second interface of the eNB, the eNB comprising:
   a receiving unit adapted to receive data over the first interface, where the first interface and the second interface alternate in having a lowest throughput capacity, which limits a combined data throughput over the first interface and the second interface,
   a caching unit adapted to cache the received data in one of a plurality of layers of an Internet Protocol stack, and
   a control unit adapted to control an output of the cached data over the second interface, based on an available throughput capacity of said second interface, thereby levelling out an alternating limiting throughput effect of the first interface and the second interface;
   the signalling node comprising:
      a granting node adapted to grant user terminals, which camp on a cell of the eNB, access to cached data in the eNB.

36. The method according to claim 1, further comprising;
   dynamically adapting an amount of data to be cached for a user based on a behaviour of the user, the behaviour of the user being represented by at least one of:
   physical location;
   time spent in a cell;
   user capability;
   service Internet Protocol (IP) address;
   Quality of Service (QoS) settings; and
   amount of data transmitted so far on a Transport Control Protocol (TCP) connection.

37. The eNB according to claim 17, wherein the caching unit is further configured to dynamically adapt an amount of data to be cached for a user based on a behaviour of the user, the behaviour of the user being represented by at least one of:
   physical location;
   time spent in a cell;
   user capability;
   service Internet Protocol (IP) address;
   Quality of Service (QoS) settings; and
   amount of data transmitted so far on a Transport Control Protocol (TCP) connection.

38. The method according to claim 34, wherein the eNB is further configured to dynamically adapt an amount of data to be cached for a user based on a behaviour of the user, the behaviour of the user being represented by at least one of:
   physical location;
   time spent in a cell;
   user capability;
   service Internet Protocol (IP) address;
   Quality of Service (QoS) settings; and
   amount of data transmitted so far on a Transport Control Protocol (TCP) connection.

39. The signalling node according to claim 35, wherein the caching unit is further configured to dynamically adapt an amount of data to be cached for a user based on a behaviour of the user, the behaviour of the user being represented by at least one of:
   physical location;
   time spent in a cell;
   user capability;
   service Internet Protocol (IP) address;
   Quality of Service (QoS) settings; and
   amount of data transmitted so far on a Transport Control Protocol (TCP) connection.

* * * * *